United States Patent
Pradhan et al.

(10) Patent No.: US 7,154,307 B2
(45) Date of Patent: Dec. 26, 2006

(54) CURRENT TRANSFER LOGIC

(75) Inventors: Pravas Pradhan, Portland, ME (US); Jianhong Ju, Gorham, ME (US)

(73) Assignee: Fairchild Semiconductor Corporation, Portland, ME (US)

( * ) Notice: Subject to any disclaimer, the term of this patent is extended or adjusted under 35 U.S.C. 154(b) by 0 days.

(21) Appl. No.: 10/720,857

(22) Filed: Nov. 24, 2003

(65) Prior Publication Data

US 2005/0110529 A1    May 26, 2005

(51) Int. Cl.
*H03K 5/22* (2006.01)
*H03K 5/153* (2006.01)

(52) U.S. Cl. .......................... 327/108; 326/83; 326/86
(58) Field of Classification Search ................ 327/108, 327/110, 378, 379, 389, 391; 326/30, 82, 326/83, 86
See application file for complete search history.

(56) References Cited

U.S. PATENT DOCUMENTS 5,111,080 A * 5/1992 Mizukami et al. ............. 326/30

(Continued)

FOREIGN PATENT DOCUMENTS

| EP | 1017196 A2 | 7/2000 |
|---|---|---|
| JP | 07-307661 | * 11/1995 |
| WO | WO 95/27353 | 10/1995 |

OTHER PUBLICATIONS

Seevinck, Evert, Current-Mode Techniques for High-Speed VLSI Circuits with to Current Sense Amplifier for CMOS SRAM's, IEEE Journal of Solid-State Circuits, vol. 26, No. 4, Apr. 1991.

(Continued)

*Primary Examiner*—Tuan T. Lam
(74) *Attorney, Agent, or Firm*—Edwin H. Paul, Esq.; Cesari and McKenna, LLP

(57) ABSTRACT

A current mode transfer logic system suitable for driving transmission lines is disclosed. In one embodiment a twisted pair transmission line is terminated in its characteristic line impedance. A signal is formed of two unequal currents, preferably of different polarities as well as magnitudes, that are driven down the two lines. The unequal currents are selectively switched between the two lines creating a logic signal of a differential current drive of unequal current magnitudes. The unequal currents are received and shunted from the distal end of each line via diode connected MOS transistors. The MOS transistors are biased to present a low impedance, but an impedance higher than the terminating resistor. The currents are amplified and converted to useable CMOS voltage levels. In another embodiment the twisted pair is replaced by two parallel transmission lines which are terminated in one resistor, equal to the sum of the characteristic impedances of each line. The terminating resistor is connected between the distal signal carrying conductors of each transmission line. The shields or return paths for each line are tied together at the distal and at the proximate (drive) ends of the line.

18 Claims, 2 Drawing Sheets

U.S. PATENT DOCUMENTS

| | | | |
|---|---|---|---|
| 5,519,728 A * | 5/1996 | Kuo | 375/257 |
| 5,592,510 A * | 1/1997 | Van Brunt et al. | 375/220 |
| 5,767,699 A | 6/1998 | Bosnyak et al. | 326/86 |
| 5,801,564 A | 9/1998 | Gasparik | 327/170 |
| 5,811,984 A | 9/1998 | Long et al. | 326/30 |
| 5,959,472 A * | 9/1999 | Nagamatsu et al. | 327/108 |
| 6,025,742 A * | 2/2000 | Chan | 327/108 |
| 6,236,269 B1 | 5/2001 | Hojabri | 330/253 |
| 6,252,432 B1 | 6/2001 | Freitas | 327/65 |
| 6,313,662 B1 * | 11/2001 | Ide | 326/83 |
| 6,320,417 B1 | 11/2001 | Kirsch et al. | 326/86 |
| 6,448,815 B1 * | 9/2002 | Talbot et al. | 326/86 |
| 6,476,642 B1 | 11/2002 | Morano | 326/86 |
| 6,590,422 B1 * | 7/2003 | Dillon | 326/86 |
| 2003/0107411 A1 | 6/2003 | Martin et al. | 327/100 |

OTHER PUBLICATIONS

Sim, Jae-Yoon, A 1-Gb/s Bidirectional I/O Buffer Using the Current-Mode Scheme, IEEE Journal of Solid-State Circuits, vol. 34, No. 4, Apr. 1999.

Sim et al. "A 1-Gb/s Bidirectional I/O Buffer Using the Current-Mode Scheme" IEE Journal of Solid-State Circuits, New York, US, Apr. 1999.

International Search Report for International Application No. PCT/US2004/037145, dated Jun. 29, 2005.

* cited by examiner

CURRENT TRANSFER LOGIC

BACKGROUND OF THE INVENTION

1. Field of the Invention

The present invention relates to sending logic signals over terminated transmission lines, and more particularly to sending differential signals over transmission lines.

2. Background Information

Sending logic (and analog) signals over transmission lines while maintaining the fidelity by impedance matching of such signals has been of interest in many technical fields, especially in communications and computer systems, for many years. This area has become increasingly important as system speeds increase and power dissipation requirements decrease.

In logic and computer systems, transmission line drivers typically began by transmitting unipolar logic (voltage) signals over matched transmission lines. Types of transmission lines used in such systems include, but are not limited to, single and paired wires, twisted pairs, shielded twisted pairs, flat cables, flat cables with a ground shield, and coaxial. The terminating resistor, equal to the line's characteristic impedance, is connected across the distant end of the transmission line between the signal and the return lines. The matching substantially eliminates reflections or ringing when the loading of the receiving circuitry impedance is one or more orders of magnitude higher than the characteristic impedance at the signal frequencies.

FIG. 1 shows a prior art logic voltage signal 10 driving a transmission line 12. When terminated with the lines characteristic impedance Rt, the voltage signal 10 is reproduced 12 across Rt. The return current will contribute to a noise signal Vn as will electrostatically and electromagnetically coupled signals from fast changing voltage and current signals in nearby circuits. Power dissipation, for example +3.3 V across a 50 ohm termination, speeds and noise Vn continue to limit the uses of driving voltage signals.

Older, slower systems built around three and five volt logic operated well sending and receiving three and five volt signals over matched transmission lines. But as speeds increased and more circuitry is placed on chips, difficulties in driving capacitance, noise, jitter and power levels become issues that have spawned other techniques.

One improvement was to reduce the voltage signal levels, and to use differential voltage drivers and receivers, but the same issues remain, albeit at a lower level.

It has been recognized that current driving techniques may have a number of advantages with respect to speed, power dissipation, noise, and jitter. FIG. 2 illustrates one advantage comparing a low voltage differential signal (LVDS) Vs driver and a current transfer logic (CTL) Is driver. The analysis assumes that the receiving end of the transmission line senses voltage for the LVDS and current for the CTL circuit. In one case, an LVDS driver results in 3.5 ma of current into the line, or a voltage at the driver of 350 mV. These levels are needed because there will be voltage loss along the line and the receiver may receive only 100 mV. The lost 250 mV represents a noise margin at the driver and attenuation due to the transmission line. Any other any noise contributions will further reduce that margin. For the CTL, a current, Is, is sent, and, assuming good quality transmission lines, and using Kirchoff's current (or charge) law, that DC current will be received at the receiver. So, a reduced current can be used with CTL resulting in substantially lower noise and power dissipation. Further, an effect of the reduced current, from FIG. 2, is that the dv/dt for the CTL is shorter than the dv/dt edge for Vs (with the same slopes) resulting in higher speed for the CTL circuit, since the signals reach their half way point faster. Moreover, for the same speed, the di/dt for the CTL circuit may be made substantially slower 20 resulting in lower EMI and lower jitter signals.

Other problems limit the LVDS system. For example, at the receiver, the LVDS will drive a current I through the terminating resistor. Prior art designs sense that voltage with a high gain amplifier, but the slew rate of the voltage signal is limited by the I/C, where C may be considerable since it is the capacitance related to the high gain amplifier required by the LVDS approach. Lowering the voltage across the terminating resistor does not help since the noise margin at the receiver will be reduced and a higher gain amplifier will effectively increase capacitance and reduce bandwidths (gain bandwidth tradeoff).

Current drivers for transmission lines are known, but such systems often use a voltage sensing across the termination resistor, and as such, suffer from many of the same problems associated with high gain voltage receiving amplifiers.

The advantages of current mode line driving are discussed in the following two articles form the IEEE Journal of Solid-State Circuits, Vol. 26, No. 4, April 1991 and Vol. 34, No. 4, April 1999, respectively entitled, "Current-Mode Techniques for High-speed VLSI circuits with Application to Current Sense Amplifier for CMOS SRAM's," and "A 1-Gb/s Bidirectional I/O Buffer Using the Current-Mode Scheme." Current sensing is discussed where diode connected transistors are biased to damp ringing in the circuits. Both articles are incorporated herein by reference.

U.S. Pat. No. 6,476,642 B1 to Morano (Morano), filed July 2000, applies a differential current driver to drive signal buses like those found on electronic backplanes. FIG. 3 diagrams such a circuit. Here the transmission line comprises two signal lines where Morano pushes a positive current I1 into one line and pulls an equal negative current I1 from the second line. Care is taken using a complex feedback bridge type circuit to balance those currents to ensure proper operation. If imbalances occur, the voltage across the Rt may be offset which may negatively affect the sensing circuit operation.

There has been a continuing need to design a current driving system where small currents are used and where currents are sensed at the receiver and only converted to logic voltage signals where capacitances are relatively ineffective. Relatively smaller currents can be used thus benefiting from the associated lower power and lower voltages.

SUMMARY OF THE INVENTION

In view of the foregoing background discussion, the present invention provides a current mode transfer logic transmission line driver system and method. The inventive system provides two transmission lines each driven from unbalanced or unequal current sources. The unequal current sources are switched between the two transmission lines in response to a logic signal. The distal ends of the transmission lines share a termination resistor arranged between their signal carrying conductors. The unequal currents are sensed at the distal end, and when the unequal currents are switched between the transmission lines, a different logic state is detected. The current mode driving and current sensing at the distal ends of the transmission lines, compared to voltage sensing, provide, at least, speed, power, noise and jitter advantages.

In preferred embodiments, the current sensing is accomplished using diode connected MOS transistors biased at an impedance level that does not substantially affect the transmission line termination. Part of the current in each transmission line is shunted from the terminating resistor through the diode connected transistors. When the input signal logic state changes, the currents shunted will change accordingly, thereby indicating the new logic state.

After the current sensing at the distal ends of the transmission lines, in a preferred embodiment, the currents are independently amplified and converted into a voltage signal related to the difference between the unequal currents. The conversion to a voltage signal affords system compatibility with typical logic systems. However, the conversion to a voltage signal occurs where capacitance effects substantially do not affect the speeds, noise margins, or jitter of the received logic signal. In another embodiment, a differential current may be sensed, amplified and then converted into a voltage signal.

In practice, the unequal currents into the jointly terminated transmission lines will return a current equal to the difference between the two currents through the shields or return current paths of the two transmission lines. In one embodiment, a single twisted pair cable is used for signal transmission. In this case there are only the two in the cable and no shield. The first wire carries forward current equaling I while the return current I/2 returns in the second wire.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
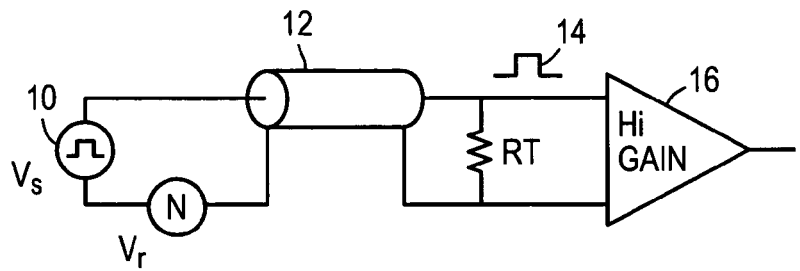
FIGS. 1 and 3 are circuit diagrams of prior art line driver circuits.
Figure 2:
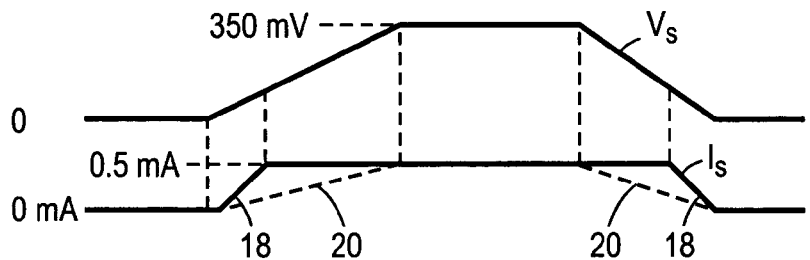
FIG. 2 is a signal comparison of an LVDS to a CTL circuit.
Figure 3:
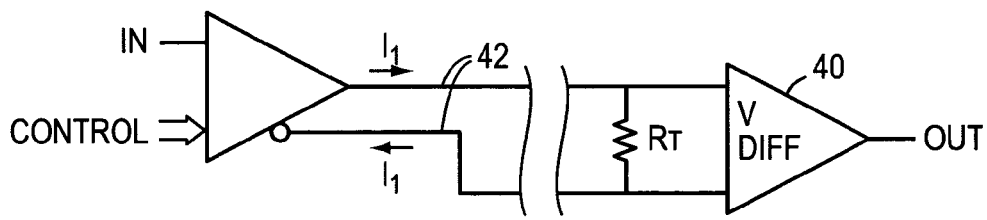
Figure 4A:
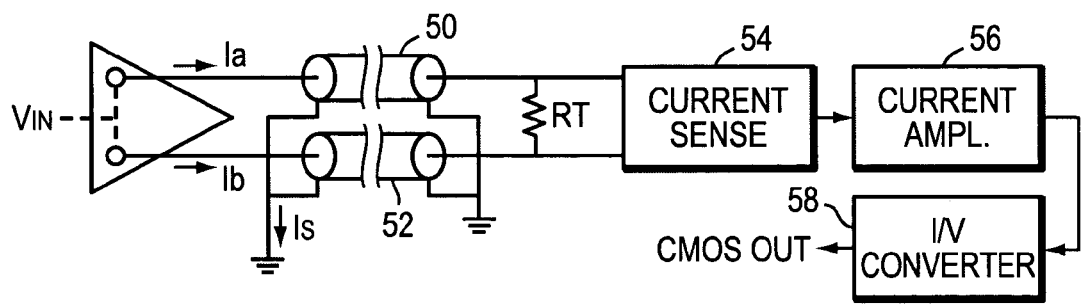
FIGS. 4A and 4B are a block diagrams of preferred embodiments of the present invention.

FIG. 4A shows a diagram of a preferred embodiment of the present invention. An input signal, Vin controls and selects output current signals Ia and Ib that are driven into the transmission lines 50 and 52. In one logic state, Ia is a positive current out into a first transmission line 50 and Ib is a negative current in from a second transmission line 52. In the opposite logic state, Ia is a negative current from the first transmission line 50 and Ib is a positive current into the second transmission line 52. In another preferred embodiment, it is possible to have no current driven into either transmission line.

If each transmission line has a characteristic impedance of 50 ohms, a 100 ohm Rt is placed across the distal ends of the signal conductors and serves to terminate both lines. Of note is that Ia and Ib are not equal to each other so that there will be a return current through the shield. Also, since Rt is across the distal ends of both transmission lines, both ends of Rt will be biased at some positive voltage in this preferred embodiment. Preferably, in one logic state, Ia is +1 ma and Ib is −0.5 ma, whereupon there is a return current, Is, in the shield of 0.5 ma. In the opposite logic state there still will be 0.5 ma returned through the shield.

Figure 4B:
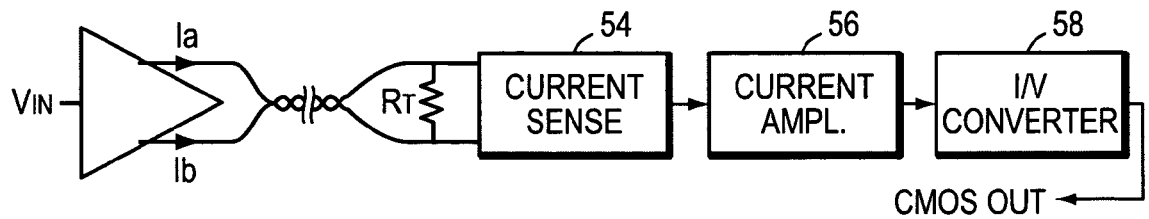

FIG. 4B illustrates another preferred embodiment using a single twisted pair as a transmission line. As in FIG. 4A, Ia and Ib are not equal to each other, and in this case the differential current will be absorbed at the current sense receiver 54.

In contrast to known voltage signal sensing techniques, FIGS. 4A and 4B illustrate a current sensing circuit block diagram 54 and 56. Using a current sense circuit virtually eliminates the negative effects of capacitance multiplication of high gain voltage receiving amplifiers. The current sensing is, in this preferred embodiment, configured in parallel with Rt, and is described in more detail below. A current amplification circuit 56 receives the sensed current and finally a current to voltage (I/V) converter 58 provides a CMOS out signal compatible with standard computing circuitry. The present invention creates a voltage signal well away from the terminating and sensing circuitry where the capacitance is relatively small and ineffective.

Figure 5:
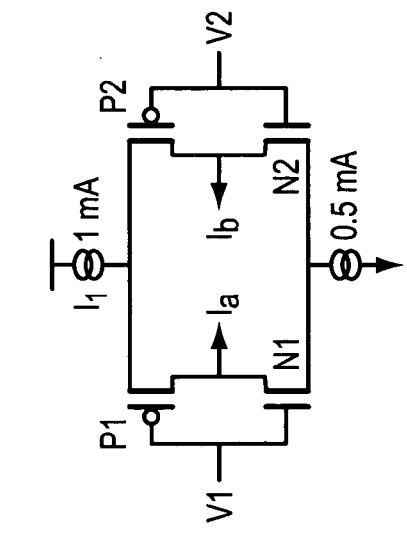
FIG. 5 is a schematic of a differential current line driver.

FIG. 5 shows one current driver circuit that may be used in accordance with the present invention. Here, when V1 is low P1 is on and I1, 1 mA, travels via P1 out as Ia. If V2 is high N2 is on and I2, 0.5 mA, travels out via N2 as a negative Ib. Reversing the logic states of V1 and V2, I2 travels out as a negative Ia and I1 travels out as a positive Ib. Typically, V2 is designed as the logic inverse of V1 for the above operation. However, if P1, P2, N1 and N2 are driven independently (not shown), it will be possible to turn them all off leaving no current in the transmission lines. It should be noted that no common mode feedback circuit (CMFB) is used to stabilize the common mode level of the output voltage. This circuit is typical for an LVDS style driver. CTL does not require CMFB due to the special receiver used at the other end, thus saving the current consumed by the CMFB circuit reducing the total power consumption of the system.

Figure 6:
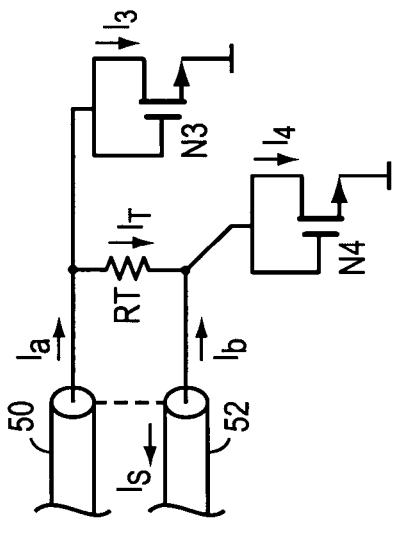
FIG. 6 is a circuit illustrating current sensing.

FIG. 6 is a schematic of a current sensing circuitry consistent with a preferred embodiment of the present invention. Here, two diode connected NMOS transistors, N3 and N4, are biased to siphon off I3 and I4, respectively, from currents in the transmission lines. N3 and N4 may be biased (not shown) along the diode-like curve to overcome any threshold and to present an impedance substantially greater than Rt to minimally affect the termination of the transmission lines. In one preferred embodiment, N3 and N4 exhibit about 1 K ohms each, although other impedances can be used as known in the art. If N3 and N4 present about 2 K ohms across an equivalent 100 ohm transmission line, the Rt can be made equal to 105 ohms or appropriately higher or lower to maintain proper transmission line termination. However, as is known in the art, there is likely to be some harmless ringing due to some impedance mismatch even if care is taken to keep the diode transistors at a high impedance state. For example, if Rt is 105 ohms across a 100 ohm transmission line, and the diode connected transistors present, for some processing reason, very high impedances, the 5 ohm mismatch will only result in a reflection coefficient of about less than 2.5 percent.

Still referring to FIG. 6, consider that Ia is 1 ma, Ib is −0.5 ma, then the return current, Is, will be 0.5 ma. N3 and N4 can be designed so that It is 0.65 ma, with N3 drawing I3 of 0.35 ma and N4 drawing I4 of 0.15 ma. The difference between I3 and I4, or 0.2 ma, is sensed, as discussed below, to indicate a logic signal, say a logic one. The negative of that logic signal is sensed when Ia and Ib exchange current levels when the input signal to the current drive changes state. In this state, I3 and I4 will exchange current levels and 0.2 ma difference is sensed as a logic zero. So a logic change from one to zero will result in 0.4 ma change in current.

Figure 7:
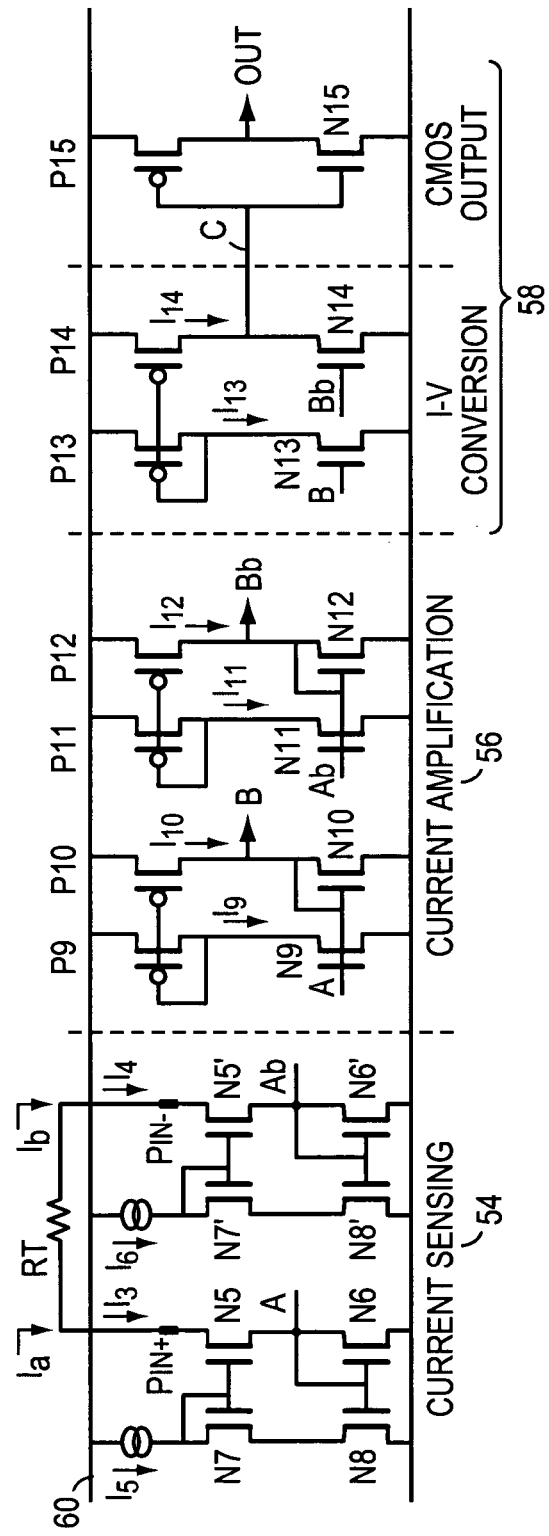
FIG. 7 is combined schematic of a receiver circuit.

FIG. 7 shows a more detailed complete receiver circuit implementation of the blocks of FIG. 4 positioned at the termination circuit end of the two transmission lines 50 and 52. The Rt is connected from Pin+ to Pin– as shown, with Ia and Ib driving the two ends of Rt, as shown in FIG. 6. FIG. 7, is a more detailed schematic of the current sense circuit 54, current amplification circuit 56, and current to voltage, I/V, circuit 58.

In FIG. 7 the current sense circuit 54 is formed by a circuit attached to each end of Rt, with a current source I5 and I6 feeding each circuit. As known in the art, these current sources will be typically formed by biasing PMOS transistors to the positive power rail 60. The current sensing circuit for I3 includes N5–N8. N7 and N8, and the current sensing circuit for I4 includes N5'–N8.' N7 and N7' are diode connected NMOS transistors that share equal drain currents with N8 and N8', respectively. Since N7 and N8 have the same drain current (I5), the gate to source voltage for N7 and N8 are equal, assuming matched transistors. The discussion for N5–N7 with respect to I3 applies directly to N5'–N7' with respect to I4, and so is not repeated below. N6 is the diode connected transistor arranged with N5 forming a controlled transistorized linear resistance to bias the diode connected devices away from the knee region and thus increase the current sensitivity. Resistances of N5 and N5' are controlled by the gate voltage of N7 and N7,' respectively, which in turn depends on current in the diode connected devices N6 and N6'. Thus the current information from the sensing element (diode connected device) is used to modify the resistance of N5 or N5' such that the effective current difference between the two branches can be increased. Resistance also has a dampening effect on a high frequency noise which appears on node A and Ab. In this circuit arrangement I5, N7 and N8 control, via the mirroring effect, I3 and the voltage drops across N5 and N6, as follows. The same current will travel through N5 and N6 so that their gate to source voltages will be equal to each, and the voltage at Pin+ via the N7 mirror. In this manner, the offset voltage of the diode connected N6 can be compensated and the impedance of N6 can be controlled.

The gates of N9 and N10 connect to the drain of N6, marked A, forming a current mirror. Similarly, N11 and N12 mirror the current in N6.' N10 and N12 are sized to provide amplified currents sensed by the I–V conversion circuit via B and Bb. When I3 changes, in a preferred embodiment, from 0.15 ma to 0.35 ma, this change is reflected at I9 and I10 via the current mirror amplification circuit 56. I10 can be made as an amplified version of the I3 change by sizing the transistors as is known in the art. Also, P9 is arranged as a diode connected transistor and may be biased (not shown) and I10 will mirror I9 but may be amplified by sizing P10. The gate to source voltage of P10 and P9 are equal. This provides the current amplification so that I10 is an amplified version of I3. A similar circuit receives I4 and provides an amplified version at I12.

FIG. 7 item 58 shows a circuit that performs the voltage conversion. The two outputs, B and Bb, are input to the gates of N13 and N14, respectively. I13 and I14 are mirrors of I10 and I12, respectively. P13 and P14 are current mirrors. There is a full differential operation using B and Bb providing a voltage output at C that drives N15 and P15 act to provide the rail to rail CMOS logic levels.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A current mode transfer logic transmission line driver system comprising:
   a transmission line, defining at least a first and a second signal carrying conductor, the transmission line defining a characteristic impedance;
   with the transfer logic in one logic state, means for selectively driving unequal signal currents through the first and the second signal carrying conductors, respectively, wherein the difference current, between the unequal signal currents, flows back to the means for selectively driving;
   a terminating resistor connected between the distal ends of the first and the second signal carrying conductors, wherein no common mode signals are introduced into or measured along the terminating resistor;
   means for receiving the unequal signal currents at the distal end of the transmission line; and
   means for sensing the unequal currents, and wherein a logic state is defined by which of the two conductors carries the larger of the unequal currents.

2. The current mode transfer logic transmission line driver system of claim 1 wherein the means for selectively driving unequal currents through the two transmission lines, comprises:
   a first current source selectably connected to the first signal carrying conductor; and
   a second current source selectably connected to the second signal carrying conductor of the first transmission line, the first and the second current sources of unequal magnitudes.

3. The current mode transfer logic transmission line driver system of claim 1 wherein the means for receiving currents at the distal end of each transmission line comprises:
   a first current receiving circuit connected between the distal end of the first transmission line and at least one return path conductor; and
   a second current receiving circuit connected between the distal end of the second transmission line and at least one return path conductor.

4. The current mode transfer logic transmission line driver system of claim 3 wherein the first and the second current receiving circuits comprises diode connected MOS transistors.

5. The current mode transfer logic transmission line driver system of claim 4 further comprising means for biasing each diode connected MOS transistor so that it presents a low impedance at the distal ends of the transmission lines, but wherein that low impedance is substantially higher than the line's characteristic impedance.

6. The current mode transfer logic line driver system of claim 1 wherein the means for sensing the unequal currents comprises means for comparing the currents in a first receiving circuit to the current in a second receiving circuit.

7. The current mode transfer logic line driver system of claim 6 wherein the means for comparing the currents in the first receiving circuit to the current in the second receiving circuit comprises:

a differential current amplifying circuit that amplifies the difference in the currents in the first and the second receiving circuits.

8. The current mode transfer logic line driver system of claim 6 wherein the differential current amplifying circuit comprises:
a first amplifying current mirroring circuit providing an first output current;
a second amplifying current mirroring circuit providing a second output current; and
a current to voltage conversion circuit, arranged to receive the first and the second output currents and provides a voltage output that is proportional to the difference between the outputs of the first and the second amplifying current mirroring circuits.

9. The current mode transfer logic transmission line driver system of claim 1 wherein the transmission line comprises:
a first transmission line defining the first signal carrying conductor and a characteristic impedance with respect to at least one return path conductor;
a second transmission line defining the second signal carrying conductor and a characteristic impedance with respect to at least one return path conductor; and
wherein the at least one return path conductor is connected to ground.

10. A method for transferring current mode logic signals over transmission lines comprising the steps of:
defining a transmission line with at least a first and a second signal carrying conductor;
defining a characteristic impedance with respect to the at least first and second signal carrying conductors;
with the logic signals in one logic state, selectively driving unequal signal currents from current sources through the two signal carrying conductors, respectively;
returning the difference current between the unequal signal currents back to the current sources;
providing a terminating resistor between the distal ends of the at least first and the second signal carrying conductors, wherein no common mode signals are introduced into or measured along the terminating resistor;
receiving the unequal signal currents from the distal end of the transmission line; and
sensing the unequal currents, wherein a logic state is defined by which of the two conductors carries the larger of the unequal currents.

11. The method for transferring current mode logic signals of claim 10 wherein the selectively driving unequal currents through the two signal carrying conductors, comprises the steps of:
selectably connecting a first current source to the first signal carrying conductor; and
selectively connecting a second current source to the second signal carrying conductor, wherein the first and the second current sources are of unequal magnitudes.

12. The method for transferring current mode logic signals of claim 10 wherein the receiving currents from the distal end of the transmission line comprises the steps of:
receiving a first current from the distal end of the first signal carrying conductor; and
receiving a second current from the distal end of the second signal carrying conductor.

13. The method for transferring current mode logic signals of claim 12 wherein the first and the second currents are received by diode connected MOS transistors.

14. The method for transferring current mode logic signals of claim 13 further comprising the steps of biasing each diode connected MOS transistor so that it presents a low impedance at the distal ends of the transmission lines, but wherein that low impedance is substantially higher than the line's characteristic impedance.

15. The method for transferring current mode logic signals of claim 10 wherein the step of sensing the unequal currents comprises the step of comparing the current in a first receiving circuit to the current in a second receiving circuit.

16. The method for transferring current mode logic signals of claim 15 wherein the step of comparing the currents in the first receiving circuit to the current in the second receiving circuit comprises the step of amplifying the difference in the currents in the first and the second receiving circuits.

17. The method for transferring current mode logic signals of claim 15 wherein the step of amplifying the difference comprises the steps of:
first mirroring and amplifying the current in the first receiving circuit and providing an first output current;
second mirroring and amplifying the current in the first receiving circuit and providing a second output current;
receiving the first and the second output currents; and
provides a voltage output that is proportional to the difference between the received first and the second output currents.

18. The method for transferring current mode logic signals of claim 10 wherein the step of defining a transmission line comprises the steps of:
defining a first transmission line having the first signal carrying conductor and a characteristic impedance with respect to at least one return path conductor, and
defining a second transmission line having the second signal carrying conductor and a characteristic impedance with respect to at least one return path conductor;
wherein the at least one return path conductor is connected to ground.

* * * * *